United States Patent [19]

Endo et al.

[11] Patent Number: 5,064,276
[45] Date of Patent: * Nov. 12, 1991

[54] LIGHT SOURCE FOR PLANAR ILLUMINATION IN LIQUID CRYSTAL DEVICE

[75] Inventors: Syuusuke Endo; Naofumi Aoyama; Toshihiko Yabuuchi; Teruo Seki, all of Mobara, Japan

[73] Assignee: Hitachi, Ltd., Tokyo, Japan

[*] Notice: The portion of the term of this patent subsequent to Mar. 20, 2007 has been disclaimed.

[21] Appl. No.: 374,148

[22] Filed: Jun. 30, 1989

[30] Foreign Application Priority Data

Jul. 1, 1988 [JP] Japan ................. 63-162502

[51] Int. Cl.$^5$ ............................ G02F 1/13; F21V 7/04
[52] U.S. Cl. ...................... 359/49; 362/31; 362/347
[58] Field of Search ............ 350/345, 334, 360; 362/31, 347

[56] References Cited

U.S. PATENT DOCUMENTS

4,630,895 12/1986 Abdala et al. ............... 350/345
4,909,604 3/1990 Kobayashi et al. ........... 350/345

Primary Examiner—Rolf Hille
Assistant Examiner—S. V. Clark
Attorney, Agent, or Firm—Antonelli, Terry, Stout & Kraus

[57] ABSTRACT

A light source device disposing light sources at both end faces of the transparent plate in which a surface of the transparent plate in the side of an observer (front surface) is formed as the inclined and curved surface in view of limiting reduction in quantity of light per unit area at the observing area being far from the light source within a certain level, the one surface of the transparent plate is formed as the rough surface to diffuse the incident light, the other surface of the transparent plate is formed as a mirror-surface, and a reflecting layer having a high lightness is disposed at the lower side of the transparent plate in order to provide sufficient luminance for observers.

13 Claims, 8 Drawing Sheets

$$y_1 = H - \frac{H-h}{(L/2-d)^n} x^n, \quad 0 \leq x \leq \frac{L}{2} - d$$

$$y_2 = h, \quad \frac{L}{2} - d \leq x \leq \frac{L}{2}$$

○: an embodiment
×: a modification with the transparent plate 4A inverted

MEASURED POINTS

LIGHT SOURCE FOR PLANAR ILLUMINATION IN LIQUID CRYSTAL DEVICE

BACKGROUND OF THE INVENTION

1. Field of the Invention

The present invention relates to a light source and more particularly to an art which may be advantageously applied to a light source of a liquid crystal display device which requires a planar illuminator.

2. Description of the Prior Art

Figure 10:
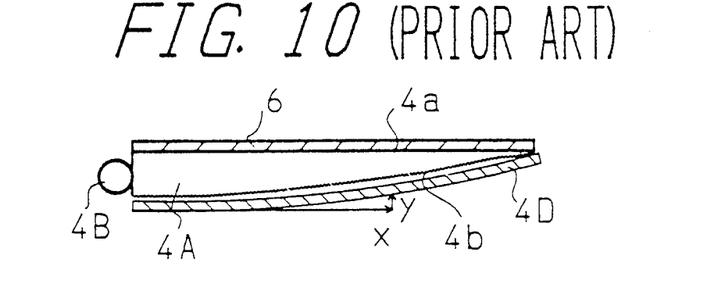
FIGS. 10, 11 are cross-sectional views of a light source of the prior art.

A flat light source of the prior art is described into the Japanese Patent Publication No. 58-17957. As shown in FIG. 10, a light source 4B is disposed at an end face of a transparent plate 4A which is constituted using a material having a good light transmission characteristic and the one surface 4a on the observing side is formed as a smooth surface while the other surface 4b opposed to the surface 4a as a rough surface. This rough surface 4b is so constituted not only as diffusing the light emitted from the light source 4B but also reflecting such light to the smooth surface 4a. The transparent plate 4A is constituted to provide an inclined plane, wherein it becomes thinner as it departs from the light source 4B.

Figure 11:
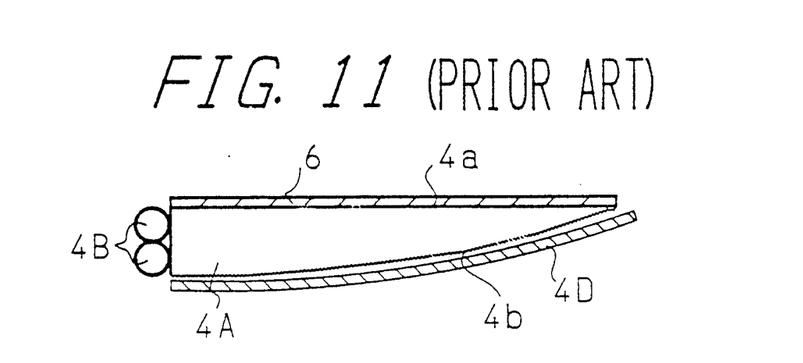

The prior art described utilizes, as shown in FIG. 10, a transparent plate which becomes thinner as is becomes far from the light source 4B (thickness is reduced with increase of distance x) such as a fluorescent bulb, for example, disposed at the end face of the transparent plate 4A to provide the planar illuminator in the constitutions, (a) a single fluorescent bulb is used as shown in FIG. 10 for a planar illuminator of comparatively small area and (b) a couple of fluorescent bulbs are used as shown in FIG. 11 for a planar illuminator of large area in order to obtain a large size and high luminance planar illuminator. However, such prior art has been accompanied by problems, for example, in the case of (a) a thin and light weight planar illuminator the constitution is not suitable for high luminance and large size panel, whereas in the case of (b) a high luminance and large size planar illuminator the constitution is not suitable for a thin and light weight panel.

SUMMARY OF THE INVENTION

It is an object of the present invention to provide an art to ensure a planar illuminator which is constituted in large size, light weight and thin depth and insure uniform high luminance over the entire part of front surface.

This object may be achieved, in a light source disposing light sources at both end faces of the transparent plate, by constituting a surface of the transparent plate on the side of an observer (front surface) as the inclined and curved surface in view of limiting reduction in quantity of light per unit area at the observing area being far from the light source within a certain level, forming a rough surface to diffuse the incident light at the one surface of the transparent plate, forming the other surface of transparent plate as a polished mirror-surface, and arranging a reflecting layer providing a high lightness having a high L* value (lightness index in ULCS color system of CIE) at the lower side of the transparent plate in order to attain the sufficient luminance for an observer.

According to the means explained heretofore, since a large size and high luminance planar illuminator can be obtained by disposing the light sources to both sides and a space can be formed between the thinnest area of the transparent plate and the uniform diffusing layer on the inclined and curved surface thereof by disposing the inclined and curved surface of transparent plate on the side of observer, non-uniformity of luminance generated by mixture of incident lights from light sources at both sides in the center of the transparent plate is sufficiently diffused owing to the diffusing effect of diffusing plate located at the area being far from the transparent plate and thereby uniform luminance can be obtained over the entire part on the diffusing plate.

Accordingly, a liquid crystal display device employing a light source can provide clear liquid crystal display image on the liquid crystal display panel.

DETAILED DESCRIPTION OF THE PREFERRED EMBODIMENTS

A constitution of the present invention will now be explained with reference to an embodiment of the light source of a liquid crystal display device to which the present invention is applied.

The like reference numerals designate the like elements having the similar function throughout the accompanying drawings and the same explanation will not be repeated hereunder.

EMBODIMENT I

Figure 1:
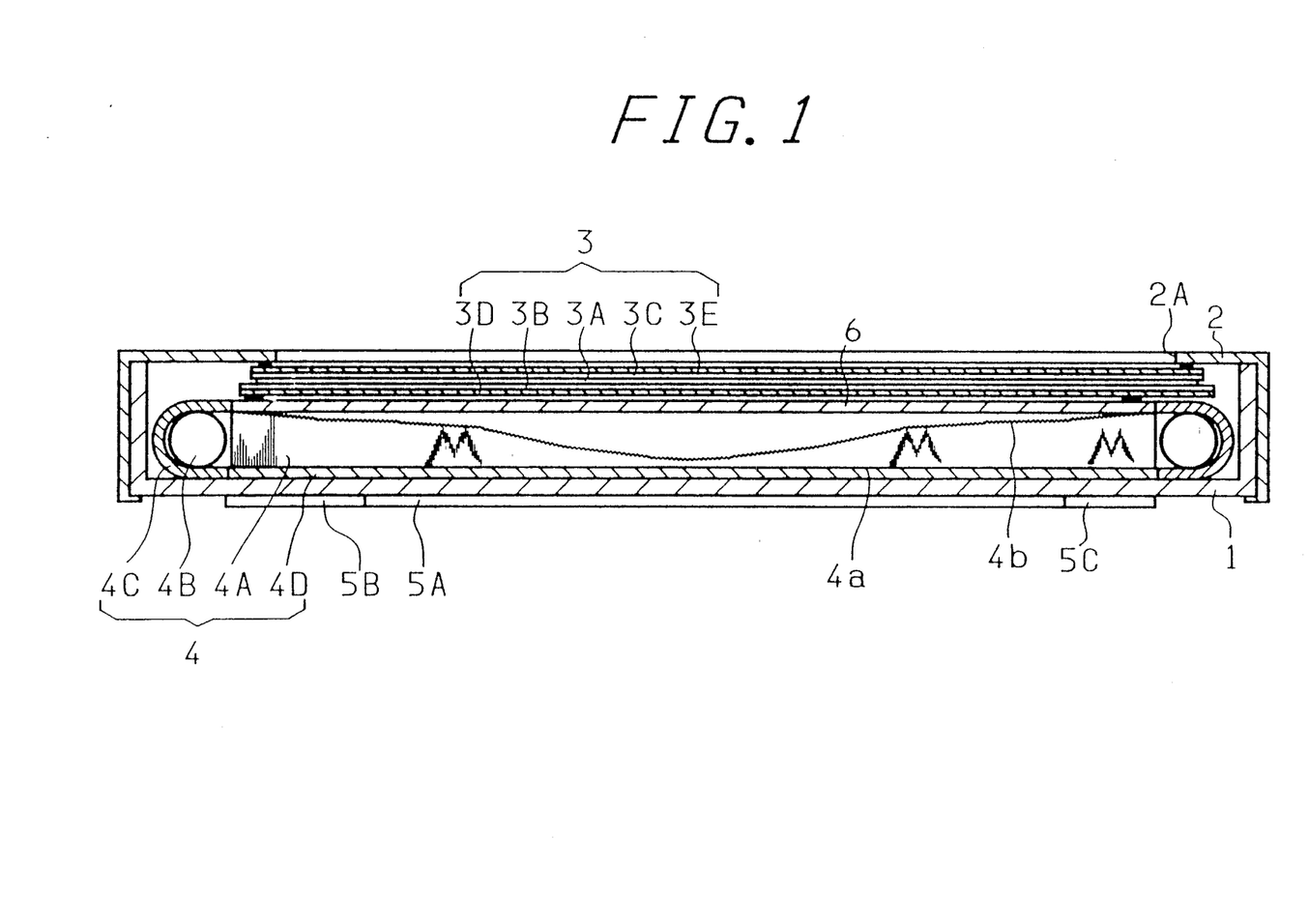
FIG. 1 is a cross-sectional view of an embodiment of the present invention.
Figure 2:
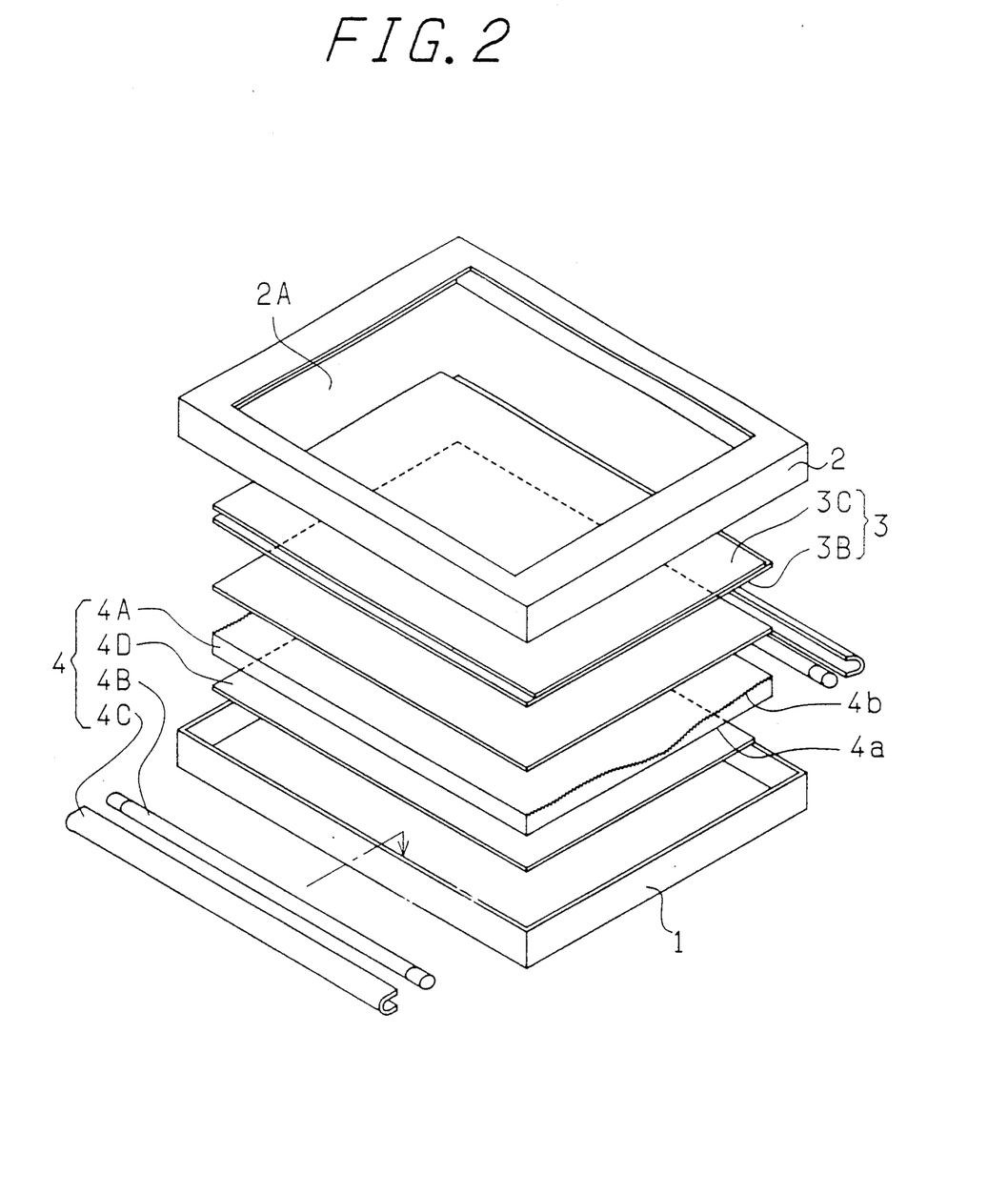
FIG. 2 is a disassembled perspective view explaining an example in which a light source of the present invention is applied to a liquid crystal display device.

A liquid crystal display device as the first embodiment of the present invention and a light source thereof are respectively shown in FIG. 1 (cross-sectional view) and FIG. 2 (disassembled perspective view).

As shown in FIG. 1 and FIG. 2, a liquid crystal display device respectively provides a liquid crystal display panel 3 and an illuminator 4 at the inside specified by a lower side frame (mold case) 1 and an upper side frame (cover) 2.

The lower side frame 1 is of a square form and is made, for example, of a resin material. The upper side frame 2 is also of a square form which engages with the lower side frame 1. The upper side frame 2 is provided with an opening area 2A at the center thereof. The opening area 2A is so constituted as exposing the liquid crystal display panel 3. The upper frame 2 is made, for example, of a metallic material such as aluminum alloy or a resin material.

The liquid crystal display panel 3 is of the dot matrix type, although not illustrated in detail, driven on the time sharing basis or driven by TFT method. The liquid crystal display panel 3 is provided with a liquid crystal part 3A at the spaced defined between a lower transparent glass substrate 3B and an upper transparent glass substrate 3C. This liquid crystal part 3A seals the liquid crystal controlled by orientation layers formed at the internal surfaces (in the liquid crystal sides) of the lower transparent glass substrate 3B and the upper transparent glass substrate 3C. As the liquid crystal of this liquid crystal part 3A, the twisted nematic type liquid crystal is used. The liquid crystal of the liquid crystal part 3A is so constituted to control the light transmission with the scanning electrodes formed on the internal surface of the lower transparent glass substrate 3B and the display electrodes formed on the internal surface of the upper transparent glass substrate 3C. On the external surface of the lower transparent glass substrate 3B, a polarizing plate 3D is disposed, while on the external surface of the upper transparent glass substrate 3C, a polarizing plate 3E, is disposed respectively.

Figure 3:
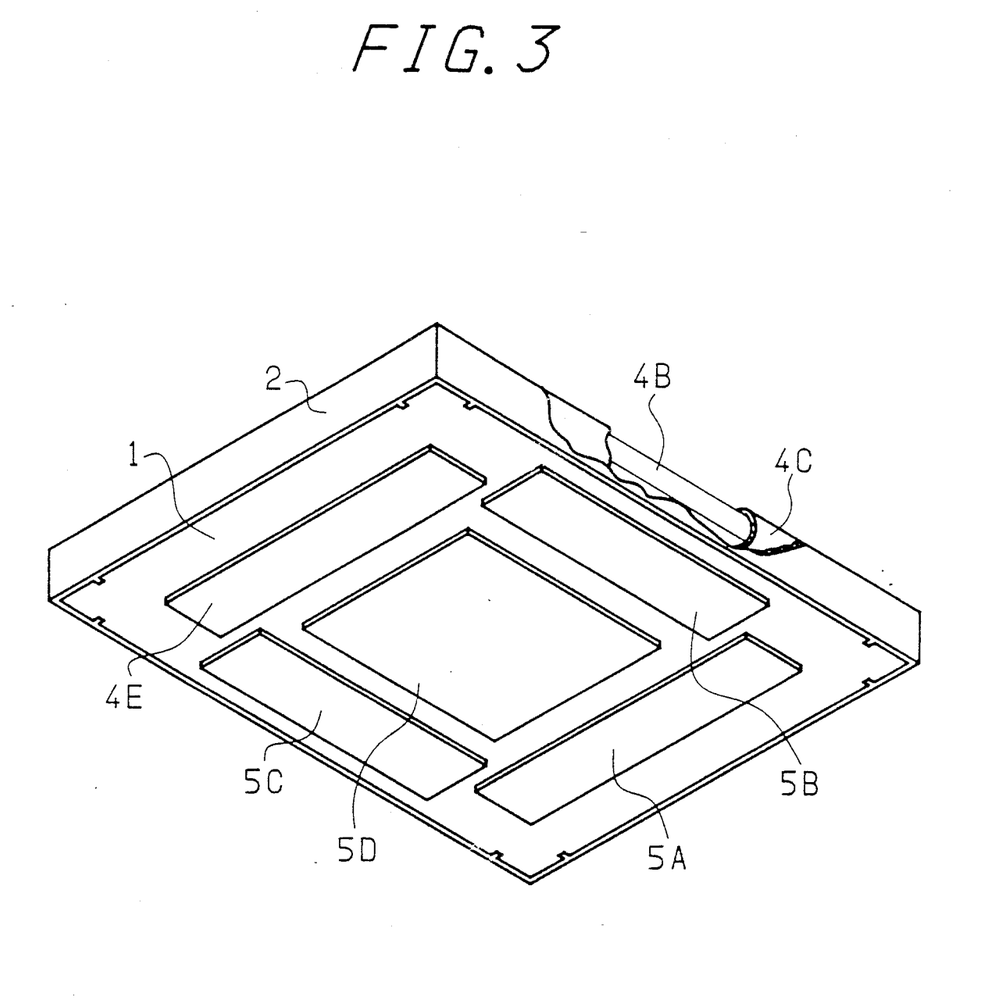
FIG. 3 is a perspective view of the rear side of a liquid crystal display device as an embodiment of the present invention.

As shown in FIG. 3 (perspective view observed from the lower side of the liquid crystal display device), the display electrodes are driven by segment driver circuits 5B and 5C which are removably attached (fitted) to the bottom of the lower frame 1. In the liquid crystal display panel 3 of this embodiment, the display electrodes are divided in the vertical direction into a couple of sections. Therefore, the segment driver circuits 5B and 5C are provided. The segment driver circuit 5B, 5C are respectively consituted by a printed circuit board (for instance, glass epoxy resin) mounting semiconductor devices for segment drivers.

The scanning electrodes are driven by the common electrode driver circuit 5A removably attached to the bottom of the lower frame 1. This common electrode driver circuit 5A is also constituted by a wiring substrate mounting semiconductor devices like the segment driver circuits 5B and 5C described previously The segment driver circuits 5B and 5C, and common electrode driver circuit 5A are respectively driven by the power supply circuit for driving the liquid crystal display (LCD) and timing generation circuit. The liquid crystal drive circuit 5D is constituted by a wiring substrate loading semiconductor devices and passive elements such as resistors and capacitors.

As shown in FIG. 1 to FIG. 3, the illuminator 4 described above principally comprises a transparent plate 4A, a light source 4B, a reflecting plate 4C for light source, a reflecting plate 4D for transparent plate and an inverter power supply circuit 4E. This inverter power supply circuit 4E is not comprised in some cases within the liquid crystal module.

Figure 4:
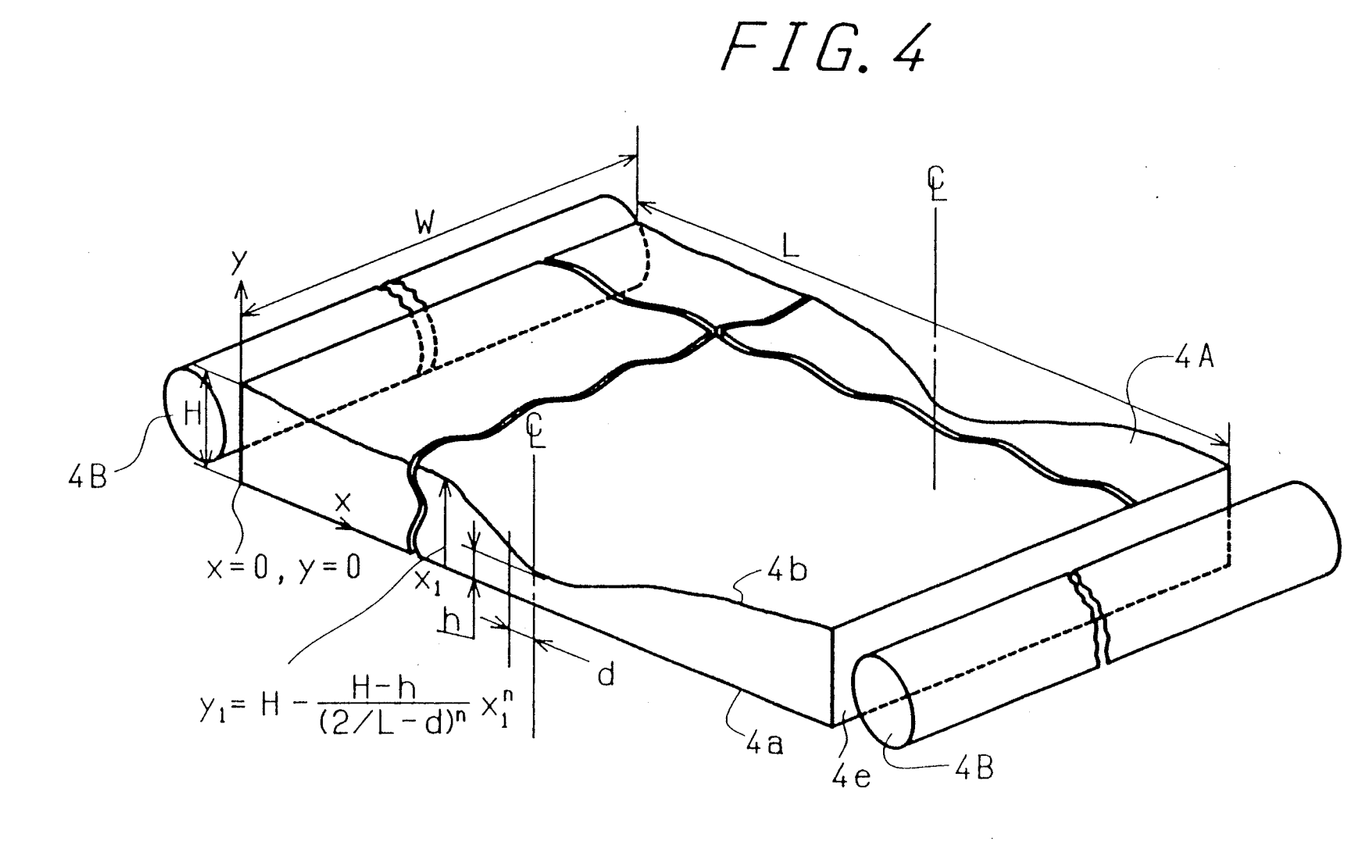
FIG. 4 is a perspective view of the essential part of a light source of an embodiment of the present invention.

As shown in detail in FIG. 4 (a perspective view observed from diagonal upper direction), the transparent plate 4A is formed by a square transparent material having light transmitting characteristic. The transparent plate 4A is constituted by an acrylic resin having the light transmission of about 90~95[%]. Moreover, the transparent plate 4A may be formed by the transparent glass material. In this embodiment, the dimension of the width direction of the transparent plate 4A is set to 250 [mm]. The dimension of the longitudinal direction of the transparent plate 4A is set to 160 [mm]. The dimension in the thickness direction H of the transparent plate 4A is set to 4~15 [mm].

The one surface of transparent plate 4A on the side of the reflecting plate 4D for transparent plate 4A is substantially formed by a flat and smooth surface 4a. The other surface provided opposite to the smooth surface 4a of the transparent plate 4A is formed by a rough surface 4b which is rougher than the smooth surface 4a. The rough surface 4b of the transparent plate 4A is substantially equal in the roughness to the surface formed by the grinding process, for example, with an emery-paper of No. 20~200. In case the rough surface 4b of the transparent plate 4A has directivity like the hair-line, it would be better from the point of view of light diffusion that the scratches are formed in the longitudinal direction of the light source 4B than that these are formed in such a direction as crossing the longitudinal direction but the equal effect can also be obtained by using a matte surface. In the case that the transparent plate is formed by the injected molding method, it is better from the viewpoint of processing-ability to form the matte surface because a degree of roughness of the surface (pitch of matte and depth of groove) can be controlled more easily and better molding-ability can also be attained. As shown in detail, the rough surface 4b of the transparent plate 4A is formed as the inclined and curved surface so that the quantity of light per unit area on the surface of diffusing plate 6 disposed on the rough surface 4b is not reduced remarkably if such unit area becomes far from the light source 4 (if the dimensions X increases). That is, the transparent plate 4A is formed to have a continuously inclined and curved surface and it becomes thinner as it becomes far from the light source 4B (its thickness changes from H to h). The inclined and curved surface of the rough platne 4b of the transparent plate 4A can substantially be expressed by the following formula.

$$y_1 = H - \frac{H - h}{(L/2 - d)^n} x^n$$

$$0 \leq x \leq (L/2 - d)$$

$$y_2 = h$$

$$L/2 - d \leq x \leq L/2$$

where,
y: distance in H or h direction
x: distance in the L direction from the light source 4B
When L=160, optimum n ranges from 2 to 3. (In the range of $L/2 \leq x \leq L$ and $y_1$, $y_2$ become the curves symmetrical with respect to the line, $x = L/2$.)
h=0.5~3.0 mm
d=0.5~6.0 mm.

The light source device 4 thus constituted forms reflection directivity with the inclined and curved rough surface 4b for the quantity of light which is more attenuated as it becomes further from the light source 4B and keeps almost constant the luminance on the surface of diffusing plate 6 on the transparent plate 4A.

Figure 5:
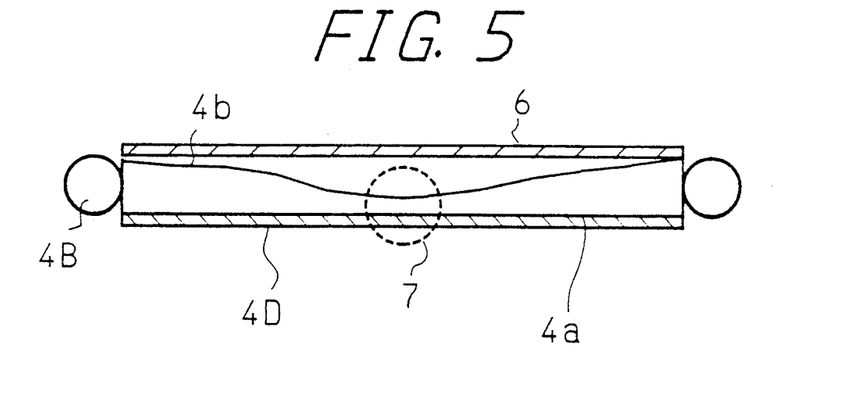
FIGS. 5, 6 are cross-sectional views for explaining the principle of a light source of the present invention.
Figure 6:
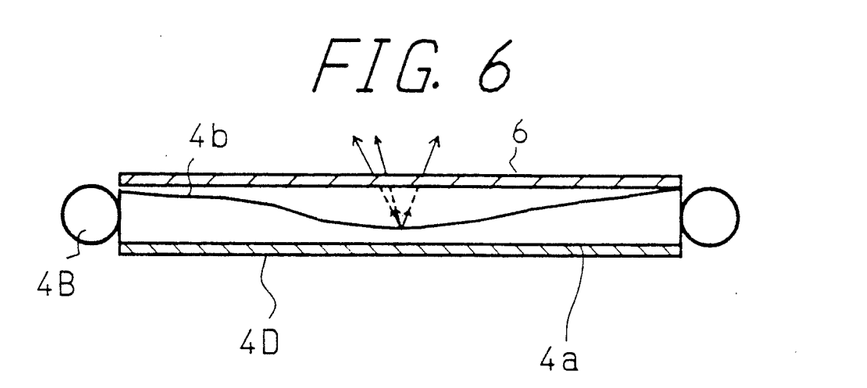

Non-uniformity of luminance, which may be easily generated, at the center (thinnest part) of the transparent plate can be prevented because, as shown in FIG. 5 and FIG. 6, the predetermined space is provided between the thinnest part of the transparent plate and light diffusing plate 6 and thereby the light is diverged until it is incident to diffusing plate and is diffused by the diffusing plate 6.

Figure 7:
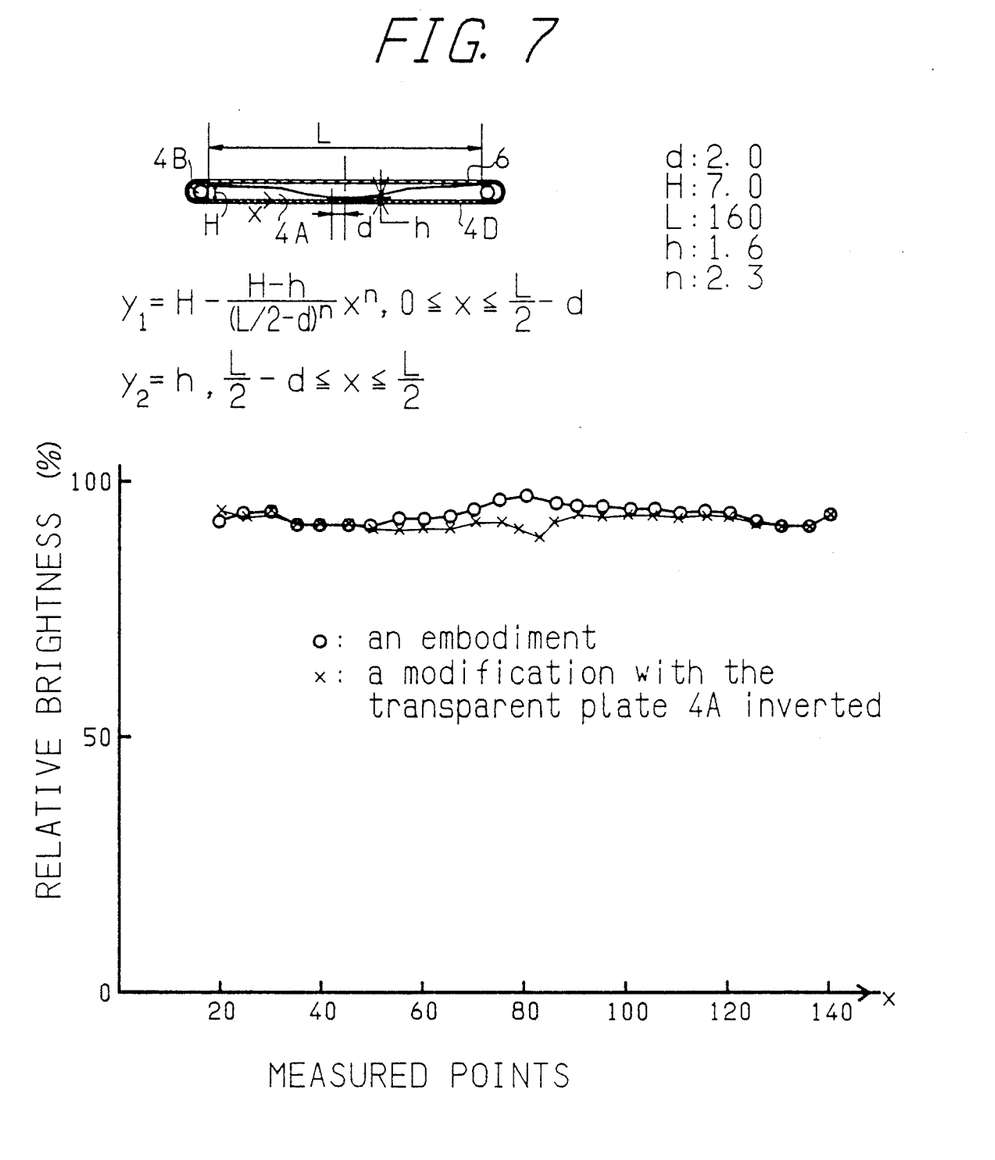
FIGS. 7, 8 are graphs showing luminance characteristics of an embodiment of the present invention.
Figure 8:
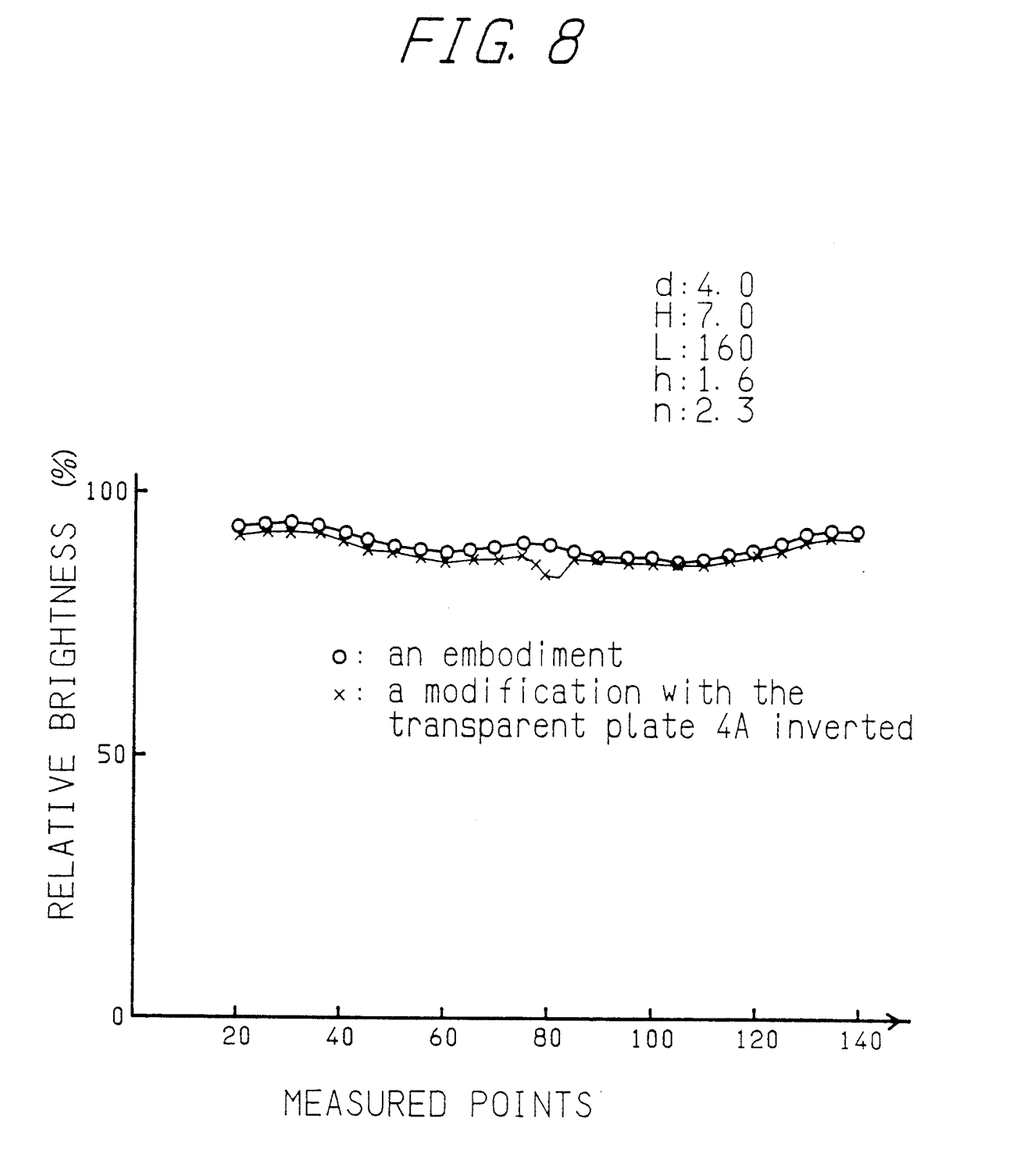

The actually measured data obtained by the inventors of the present invention through researches are shown in FIG. 7 and FIG. 8. In order to show drastic improvement in uniformity of luminance by providing the space between the thinnest part of the transparent plate and the light diffusing plate 6 thereof, distribution of luminance on the surface in such a case that the smooth surface 4a of the transparent plate is disposed on the side of observer, namely the space is not disposed between the thinnest part of the transparent plate and the light diffusing plate 6 thereof, and distribution of luminance on the surface in such a case that uniformity of luminance is improved by disposing the space between the thinnest part of the transparent plate 4A and the light diffusing plate 6 thereof are indicated for the comparison purpose. FIG. 7 shows the data in case the dimension d is 2.0 mm and FIG. 8 shows the data in case the dimension d is 4.0 mm. As will be apparent from these figures, when the smooth surface of the transparent plate is located on the side of observer, reduction of luminance at the center is distinctive and, on the other hand, uniformity of luminance at the center is good according to the present invention. In addition, uniformity of luminance at the center can be improved by increasing the dimension d to a certain degree (practically, about 2.0~6.0 mm).

The liquid crystal display device employing the light source device thus constituted is capable of making clear the liquid crystal display image on the liquid crystal display panel 3. In this case, any problem does not occur for practical use when luminance at the display surface of liquid crystal panel varies continuously within 30%.

The light source 4B is arranged at the one end of the transparent plate 4A. As the light source 4B, a cold cathode tube, for instance, in the length of about 270[mm] is used. This cold cathode fluorescent tube is driven by the inverter power supply circuit 4E disposed on the bottom of the lower frame 1. This inverter power supply circuit 4E is so designed, for example, as to convert the DC power source of 5~30[V] into the AC power source of 300-400[V] of 30~50[KHz]. The inverter power supply circuit 4E is constituted, like the circuits 5A~5D, by the wiring substrate mounting semiconductor devices.

Figure 9:
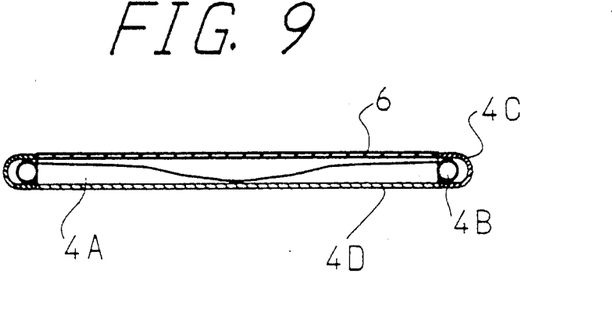
FIG. 9 is a cross-sectional view of the essential part of a light source of another embodiment of the present invention.

The reflecting plate 4C for light source covers the light source 4B, except a part thereof, in order to effectively reflect the light of light source 4B toward the transparent plate 4A and provides the ]-shaped or U-shaped cross-section. The reflecting plate 4C for light source is formed, for example, by an aluminum plate coated with white paint (acrylic resin paint on the surface (on the side of light source 4B). Particularly, the white paint is required to have the value of lightness L* of 90 or more and the lightness value of 94 or more is more preferable. Moreover, the reflecting plate 4C for light source 4B may also be designed to perfectly cover the light source 4B for the transparent plate 4A as shown in FIG. 9 with the metal-evaporated sheet having a high reflectivity. In this case, lead of light flux may be minimized and thereby improvement of luminance can also be expected. Meanwhile, the former design may be thought to be preferably in the point of view of assembling and easiness in replacement. The reflecting plate 4D is disposed on the smooth surface 4a of the transparent plate 4A so that it can effectively reflect the light of light source 4B to the side of liquid crystal display panel 3 (rough surface 4b of the transparent plate 4A). This reflecting plate 4D is made, for instance, of the material which is also used to make the reflecting plate 4C for the light source mentioned above and in this case, the higher the value of lightness L* of the reflecting plate, the more recommended it is and 94 or more is preferable. The light diffusing plate 6 is arranged between the liquid crystal display panel 3 and the transparent plate 4A of the light source 4. The light diffusing plate 6 is formed, for example, by a semi-transparent acrylic resin. This acrylic resin should have the total light transmissivity of 40~80% and diffused light transmissivity of 40~80% and it is also preferable that the plate thickness is about 0.5~3.0 [mm] and moreover both sides are processed as rough surfaces. It is necessary to give the function to prevent generation of Newton ring at the LCD surface or the surface with which the transparent plate is in intimate contact.

The present invention can also provide the equivalent effect even by forming the rough surface 4b of the transparent plate 4A of the light source 4 as the continuously inclined and curved surface extending from the position spaced from the light source by the predetermined distance (partially inclined and curved).

In above embodiment, the rough surface 4b is provided in the side of light diffusing plate 6 on the transparent plate 4A but it is of course possible that this rough surface 4b is eliminated and the effect obtained by the rough surface 4b is realized by the reflecting surface of the reflecting plate 4D or the surface 4a.

In the present embodiment, a hot cathode fluorescent bulb may be used as the light source 4B of the light source 4. In addition, in case the dimension L is small (for instance, it is 50 [mm] or less), the light source 4B may be formed by a plurality of LEDs.

Moreover, it is certain that the luminance may be raised by arranging a plurality of light sources to each end face of the transparent plate 4A.

Since the light source 4 of the present invention is capable of providing high luminance, it may effectively be applied to constitute a liquid crystal display panel 3 of the liquid crystal display device of the supertwisted nematic type white and black mode (having the disadvantage of lower light transmissivity).

While the present invention has been particularly shown and described with references to a preferred embodiment thereof, it will be understood by those skilled in the art that the present invention is not limited thereto and foregoing and other changes or modifications in form and details may be made therein without departing from the spirit and scope of the invention.

For example, the present invention can preferably be applied to a light source device of the liquid crystal display device employing the active matrix system in which a pixel is formed by a thin film transistor and a transparent pixel electrode.

In addition, the present invention can also be applied to a light source device of wrist watches and meters, without limitation to the light source device of the liquid crystal display device, namely to all light source devices which employs a planar illuminator.

The effect which may be attained by a typical device of the present invention disclosed in this patent specification can be briefly summarized as that the luminance of planar illuminator type light source device may be made substantially uniform over the entire part of display surface.

What is claimed is:

1. A light source device comprising, a transparent plate, a reflecting plate disposed adjacent a first surface of said transparent plate, and at least one light source disposed at each of first and second end faces of said transparent plate, a second surface of said transparent plate opposite said first surface, said second surface including an inclined and curved surface portion with a thinnest portion of said transparent plate at the center area of said transparent plate between the two end faces.

2. A light source device according to claim 1, wherein the shape of said inclined and curved surface portion of said second surface is expressed by an exponential function of the distance from said light sources and said shape is symmetrical about the center area between said light sources.

3. A light source device according to claim 1, wherein said thinnest part at the center area is almost flat.

4. A light source device according to claim 1, wherein a light diffusing surface is provided on said second surface.

5. A light source device according to one of claims 1 to 4, wherein a liquid crystal display panel is disposed on said second surface of said transparent plate to be used for liquid crystal display device.

6. A light source device according to one of claims 1 to 5, wherein one of said end faces of said transparent plate is provided with a plurality of light sources.

7. A light source device according to claim 2, wherein said exponential function is $$y = H - \frac{H - h}{(L/2 - d)^n} x^n \text{ for } 0 \leq x \leq (L/2 - d)$$

-continued
$$y = h \text{ for } L/2 - d \leq x \leq L/2$$

where
y is a distance from said first surface to said second surface,
x is a distance from said first end face,
L is a length of said transparent plate,
H is the value of y at said first end face,
h is the value of y at x being (L/2−d),
d is a distance in said x direction of a flat portion of said second surface at the center area of said transparent plate between said light sources disposed at said two end faces, and
n is an arbitrary positive number larger than unity,
and said inclined and curved second surface is symmetrical with respect to x being L/2.

8. A light source device according to claim 4, wherein said light diffusing surface is a rough surface.

9. A light source device according to claim 1, wherein said transparent plate is made of acrylic resin.

10. A light source device according to claim 1, wherein a diffusing plate is disposed adjacent to said second surface.

11. A light source device according to claim 7, wherein said h is in the range of 0.5 to 3.0 mm and said d is in the range of 0.5 to 6.0 mm.

12. A light source device according to claim 4, wherein said light diffusing surface is a matted surface.

13. A light source device according to claim 8, wherein said rough surface has directivity.

* * * * *